United States Patent
Fearnley et al.

[15] 3,639,290
[45] Feb. 1, 1972

[54] COMBINED CLEANING AND ANTISOILING COMPOSITIONS

[72] Inventors: Charles Fearnley, Romiley; Thomas Ivor Jones, Poynton, both of England

[73] Assignee: Geigy Chemical Corporation, Ardsley, N.Y.

[22] Filed: Apr. 10, 1967

[21] Appl. No.: 629,431

[30] Foreign Application Priority Data

Apr. 14, 1966    Great Britain ..................... 16,308/66

[52] U.S. Cl. .............................. 252/545, 252/89, 252/526
[51] Int. Cl. ......................................................... C11d 3/18
[58] Field of Search .......................... 252/137, 152, DIG. 14

[56] References Cited

UNITED STATES PATENTS

| | | | |
|---|---|---|---|
| 2,806,842 | 9/1957 | Gerecht et al. | 252/152 X |
| 3,085,067 | 4/1963 | Anderson | 252/152 X |
| 3,150,098 | 9/1964 | Wilson | 252/152 |
| 3,254,028 | 5/1966 | Wixon | 252/137 |
| 3,326,807 | 6/1967 | Guest et al. | 252/152 |
| 3,340,217 | 9/1967 | Woodruff | 252/152 X |
| 3,368,977 | 2/1968 | Tuvell | 252/137 |
| 3,313,734 | 4/1967 | Lang et al. | 252/152 |

OTHER PUBLICATIONS

Schwartz and Perry, " Surface Active Agents and Detergents," Vol. II, 1958, p. 678

Primary Examiner—Leon D. Rosdol
Assistant Examiner—M. Halpern
Attorney—Karl F. Jorda and Martin J. Spellman

[57] ABSTRACT

Combined cleaning and antisoiling compositions containing a stabilizing aqueous nonfilm-forming dispersion of homo- or copolymer of styrene and a detergent-mixture comprising sulphate-type detergent and foam stabilizing agent, which compositions are useful for cleaning fiber and fiber assemblies and at the same time leaving on the treated material an antisoil finish; a method of treating the said materials to improve appearance or inhibit deterioration thereof; and fibers and fiber assemblies treated by such method.

27 Claims, No Drawings

COMBINED CLEANING AND ANTISOILING COMPOSITIONS

BACKGROUND OF THE INVENTION

1. Field of the Invention

The present invention relates to chemical compositions for treating fibers or fiber assemblies to improve the appearance and inhibit the deterioration of the appearance thereof, and in particular to combine cleaning and antisoiling compositions for treating fibers or fiber assemblies.

2. Description of the Prior Art

British Pat. No. 882,635 describes a cleaning composition comprising a compound represented by the formula $$ROSO_3M$$

where R is an aliphatic hydrocarbon group and M an alkali metal, a second constituent represented by the formula $$R^1CON(CH_3)CH_2COO\ A$$

where $R^1$ is an aliphatic hydrocarbon group, and A is either a hydrogen atom or an alkali metal, and water.

Cleaning compositions such as those described in British Patent No. 882,635, once dry, are conventionally taken from the fiber or fiber assembly, together with removed soil, by sweeping or suction cleaning operations. However, such known cleaning compositions are not entirely removed by these cleaning operations since the treated fiber or fiber assembly is in general tacky and so tends to retain deposited soil.

It is also known to impart a certain soil resistance to the pile of a fiber or fiber assembly such as a carpet by applying to the surface of the pile a dilute colloidal water solution of a specified nonfilm-forming synthetic resin to form a coating of discrete particles confined substantially to the outer, exposed portions of the pile yarns forming the pile elements and drying the treated pile at an elevated temperature, the resin being polyvinyl chloride, polyvinyl acetate, a vinyl chloride-vinylidene chloride copolymer, polystyrene or a styrene-butadiene copolymer and having a softening point of at least about 175° F. and a particle size in the latex ranging from 0.01 to 0.1 microns, the coating ranging in weight from about 0.1 ounce to about 1.0 ounce per square yard of pile surface and the drying exposing the resin coating to a temperature below the softening point of the resin. A serious drawback of carpets rendered soil resistant by this known method is that the coating imparting said resistance is dusted off very rapidly and may cause serious changes in the color of the treated carpet.

Furthermore, French Pat. No. 1,416,813, delivered Sept. 27, 1965, describes compositions for application to a fiber or fiber assembly to improve the appearance or inhibit the deterioration of the appearance thereof, which comprises an aqueous dispersion of polystyrene or of a polystyrene copolymer containing as emulsifying agent a betaine or a mixture or two or more betaine compounds, substantially all the particles of the dispersed polystyrene having diameters within the range from 0.1 to 0.25 microns, whereby coatings obtained with such compositions on the materials to be treated cannot be dusted off easily and hence offer much longer protection to the fiber material coated therewith.

SUMMARY OF THE INVENTION

The present invention provides a combined cleaning and antisoiling composition for application to fibers or fiber assemblies to improve the appearance and inhibit the deterioration of the appearance thereof, which comprises a stable shampoo concentrate, a stabilized aqueous nonfilm-forming dispersion of polystyrene or a styrene copolymer, and water, substantially all the particles of the dispersed polystyrene or styrene copolymer having diameters within the range of from 0.01 to 2.0 microns.

We have found that, surprisingly, the antisoiling agent contained in the combined cleaning and antisoil composition of the present invention remains on the fiber or fiber assembly during the conventional operations to remove dried cleaning agent and soil and can thus act to inhibit subsequent soiling after treatment of a fiber or fiber assembly with the composition of the present invention.

The present invention also provides a method of treating a fiber or fiber assembly to improve the appearance or inhibit the deterioration of the appearance thereof, which comprises applying to the surface of the fiber or fiber assembly a composition comprising a stable shampoo concentrate, an aqueous, stabilized, nonfilm-forming dispersion of polystyrene or a styrene copolymer, and water.

The present invention further provides a fiber or fiber assembly provided with an antisoil finish by treatment according to the present invention.

DETAILED DESCRIPTION OF THE INVENTION AND PREFERRED EMBODIMENTS THEREOF

More in detail, the invention provides for combined cleaning and antisoiling compositions which contain A. Aqueous shampoo concentrate which is present in the composition of the invention generally within the range of from about 20 percent to 99 percent by weight, more preferably within the range of from 60 percent to 90 percent by weight, based on the total weight of the composition; and B. Aqueous, stabilized, nonfilm-forming dispersion of polystyrene or copolymer of styrene which is present in the composition of the invention generally within the range of from about 1 percent to 80 percent by weight, more preferably within the range of from 10 percent to 40 percent by weight, based on the total weight of the composition.

The solids content of the said shampoo concentrate ranges generally from about 1 percent to about 30 percent by weight based on the total weight of the concentrate.

The aqueous dispersion of the styrene polymer or copolymer which is present in the composition of the invention may contain, generally, a proportion within the range of from 10 to 60 percent by weight of total solids. Preferably, however, the solids content of the aqueous dispersion of the styrene polymer or copolymer is within the range of from 30 to 50 percent by weight, calculated on the total weight of the aqueous polymer dispersion.

The stable shampoo concentrate which is present in the composition of the invention may be, for example, a mixture of one or more detergent compounds having a formula $$ROSO_3M \qquad (I)$$

wherein R represents an aliphatic hydrocarbon group and M represents an alkali metal or an ammonium radical, and one or more foam stabilizing compounds having the formula $$R^1CON(CH_3)CH_2COO\ A \qquad (II)$$

wherein $R^1$ represents an aliphatic hydrocarbon group and A represents hydrogen, an alkali metal or an ammonium radical. The compound of formula I may be, for example, sodium myristyl sulphate, sodium hexadecyl sulphate, potassium stearyl sulphate, ammonium oleyl sulphate, potassium lauryl sulphate, ammonium lauryl sulfate, sodium stearyl sulphate or sodium oleyl sulphate, but is preferably sodium lauryl sulphate.

The compound of formula II may be, for instance, sodium N-myristoyl sarcosinate, sodium N-stearoyl sarcosinate, sodium N-oleoyl sarcosinate, potassium N-oleoyl sarcosinate, ammonium N-oleoyl sarcosinate, potassium N-lauroyl sarcosinate or ammonium N-lauroyl sarcosinate, but is preferably sodium N-lauroyl sarcosinate.

As alternatives to the sulphate detergent compounds having the formula I, other detergent compounds may be employed in the shampoo concentrate, for instance alkali metal alkyl benzene sulphonates such as sodium dodecyl benzene sulphonate or potassium dodecyl naphthalene sulphonate; alkali metal salts of secondary alkyl sulphates, for example the potassium salt of 2-ethylexyl sulfate; or alkali metal or ammonium salts of alcohol sulphates, for instance the sodium, lithium or ammonium salts of lauryl alcohol sulphate.

Instead of the foam stabilizers having the formula II, the shampoo concentrate may comprise, as the foam stabilizing compound, an alkali metal or ammonium salt of an alkyl phenol polyglycol ether sulphate, for example the sodium or ammonium salt of a sulphated condensate of nonyl phenol and 6 molar proportions of ethylene oxide; condensate of nonyl phenol and 9 molar proportions of ethylene oxide; or an amide of a higher fatty acid, preferably of from 12 to 22 carbon atoms, the nitrogen atom of which amide is preferably monosubstituted by lower alkanol, or disubstituted by lower alkanol or by lower alkanol and lower alkyl, and preferably an amide condensate based upon naturally occurring acids, for example coconut monoisopropanolamide, lauric monoisopropanolamide or tallow monoethanolamide.

It is also preferred that the total proportion of the detergent compound of formula I or an alternative thereto described hereinbefore, as solid material, in the aqueous shampoo concentrate is within the range of from 1 percent to 20 percent and more preferably within the range of from 5 to 10 percent by weight based on the total weight of the aqueous concentrate. Preferably also, the total proportion of the foam stabilizing compound of formula II or an alternative thereto described hereinbefore, as solid material, is within the range of from 0.1 to 10 percent, more preferably within the range of from 2 to 5 percent by weight, based on the total weight of the aqueous concentrate.

The stabilized aqueous dispersion of polystyrene of a styrene copolymer antisoil component of the composition of the present invention, must be essentially nonfilm-forming, that is to say the polymer should not form a coherent film when dried from an aqueous dispersion at a temperature, for example, within the range of from 0° to 80° C.

If a stabilized, aqueous, nonfilm-forming dispersion of polystyrene is present in the composition of the invention, the polystyrene is conveniently uncross-linked material of high-molecular weight, that is, within the range of molecular weight conventionally obtained by emulsion polymerization, for example within the range of from $15 \times 10^4$ to $2 \times 10^6$. However, instead of a dispersion of polystyrene, a copolymer of styrene with not more than 5 percent by weight, and preferably not more than 2 percent by weight, of divinyl benzene, or acrylic or methacrylic acid or an alkyl ester or amide thereof may be employed. The amount of comonomer used is such that a nonfilm-forming copolymer is produced on drying the copolymer from an aqueous dispersion thereof at a temperature below 80° C. If the copolymer contains an alkyl acrylate or methacrylate, the alkyl group preferably contains from one to eight carbon atoms and the acrylate or methacrylate may be, for example, methyl, ethyl, n-butyl, iso-butyl or 2-ethylhexyl acrylate or methacrylate.

The aqueous, nonfilm-forming dispersion of polystyrene or styrene copolymer may be stabilized by the addition of an anionic dispersing agent, for instance sodium dinaphthylmethane disulphonate, sodium dioctyl sulphosuccinate or sodium N-lauroyl sarcosinate, or a nonionic dispersing agent, for instance an ethylene oxide condensate with a fatty alcohol, an ethylene oxide condensate with an alkyl phenol or an N-alkyl betaine, for instance N-hexadecyl betaine.

The proportion of dispersing agent stabilizer which is present in the aqueous, nonfilm-forming dispersion may be, for instance, within the range of from 0.5 to 10 percent by weight, more preferably within the range of from 0.5 to 3.0 percent by weight based on the total weight of the aqueous dispersion.

Substantially all the particles of the dispersed polystyrene or styrene copolymer have diameters within the range of from 0.01 to 2.0 microns. However, it is preferred that substantially all the particles of the dispersed polystyrene of styrene copolymer have diameters with the range of from 0.03 to 0.15 microns.

The styrene homopolymer or copolymer which may be present in the composition of the invention may be produced for example, by a conventional emulsion polymerization process. Styrene monomer may, for instance, be polymerized in an aqueous medium in the presence of ferric chloride, hydrogen peroxide, and a stabilizer which may be an anionic, nonionic, or an N-alkyl betaine dispersing agent, to produce a dispersion of polystyrene. Other polymerization catalysts which may be used instead of ferric chloride and hydrogen peroxide include, for instance, persulphate-bisulphate or persulphate-ferrous ion, hydrogen peroxide, potassium persulphate and ammonium persulphate.

Especially preferred composition according to the invention consist essentially of A. From 60 to 90 percent by weight, calculated on the total weight of the composition, of aqueous shampoo concentrate comprising
  i. From 5 to 10 percent by weight, based on the total weight of the aqueous concentrate, of a detergent compound of formula I, and most preferably of sodium lauryl sulphate;
  ii. From 2 to 5 percent by weight, based on the total weight of the aqueous concentrate, of a foam stabilizing compound of formula II, and most preferably of sodium N-lauroyl sarcosinate; and B. From about 10 to 40 percent by weight, calculated on the total weight of the composition, of aqueous, stabilized nonfilm-forming dispersion of polystyrene or copolymer of styrene, which aqueous dispersion has a solid content of from 30 to 50 percent by weight, based on the weight of the aqueous polymer dispersion.

The composition of the invention may be applied to the fiber or fiber assembly by any convenient method. For example, the composition may be sprayed, padded or brushed on the fiber or fiber assembly; or the fiber or fiber assembly may be impregnated with the composition. A convenient method of applying the composition to a fiber or fiber assembly is to pass a roller applicator impregnated with the composition in the form of a liquid and/or foam over the surface of the fiber or fiber assembly. After drying, the composition may subsequently be transported, together with removed soil, by such conventional means as sweeping or suction cleaning operations, leaving an antisoil finish on the fiber or fiber assembly.

The fiber or fiber assembly may be composed of or comprise a variety of vegetable animal or synthetic fibers or a mixture thereof, for instance wool, cotton, jute, silk, regenerated cellulose, acetate rayon, or a polyamide, polyester, polyolefine, polyvinylidene chloride or polyacrylic fiber, or a mixture of a vegetable and/or synthetic fiber with wool. The fiber assembly may be, for instance, a pile yarn or fabric made form such fibers or fiber mixtures, for example, rugs, tufted carpets, other carpeting materials, upholstery, curtains, and "-flock" bonded or printed materials.

The following examples further illustrate the present invention. Parts by weight shown therein bear the same relation to parts by volume as do kilograms to litres. Percentages are expressed by weight unless otherwise stated.

EXAMPLE 1a 0.25 parts of potassium persulphate were dissolved in 30.0 parts of water to form the catalyst solution. 12.2 parts of a 35 percent weight/volume aqueous solution of sodium N-lauroyl sarcosinate and 0.25 parts of caustic soda were mixed with 130 parts of water in a reaction vessel fitted with a stirrer, a reflux condenser and a thermometer. The contents of the reaction vessel were stirred and heated to 40° C.; 10 of styrene monomer were then added. When the temperature of the reaction mixture reached 60° C., 5.0 parts of the catalyst solution were added and the temperature of the reaction mixture raised to 88° to 89° C. At this temperature, the reaction mixture attained a blue coloration. A further 72 parts of styrene monomer and the remaining catalyst solution were added over a period of 2 hours at a reaction temperature of 88° to 90° C. After the addition of monomer and catalyst was complete, the reaction mixture was stirred at 88° to 90° C. for a further 30 minutes. The resulting dispersion was then cooled to 30° C. and filtered. The product was a translucent white dispersion with a total solids content of 33 percent (by weight) the pH value was approximately 6.5.

EXAMPLE 1b

One hundred seventy-five parts of a shampoo concentrate were made up by mixing 12.5 parts by weight of sodium lauryl sulphate, 2 parts by weight of a 35 percent weight/volume aqueous solution of sodium N-lauroyl sarcosinate, 110.5 parts of water and 50 parts by weight of an aqueous, stabilized, nonfilm-forming polystyrene dispersion (particle size of polystrene 0.03 to 0.1 micron) containing 33 percent by weight of solids (approximately 31 percent of polystyrene), and obtained according to the procedure described in example 1a.

One part of the concentrate so obtained was diluted with 9 parts by volume of water and placed in a foam applicator and applied to an undyed scoured white "nylon 66" (polyhexamethylene adipamide) tufted carpet to give 2 percent of polystyrene dispersion on fiber in alternate strips, leaving an untreated strip between each treated strip to facilitate visual comparison. At this stage the clean appearance of the treated and untreated strips was noted. The carpet was carefully dried and subjected to tread soiling in a test area. After the wear of each day (a calculated 500 to 700 treads), the carpet under test was vacuum cleaned. At the end of the test, the total number of treads applied to the carpet under test was approximately 14,000. Visual examination of the carpet indicated a low degree of retained soil on the treated strips of carpet but a heavy residual soil on the untreated portion.

EXAMPLE 2a 0.25 parts of potassium persulphate were dissolved in 25 parts of water to form the catalyst solution. Two parts of sodium dodecylated oxydibenzene disulphonate were dissolved in 125 parts of distilled water in a reaction vessel fitted with a stirrer, a reflux condenser and a thermometer. The contents of the reaction vessel were stirred and heated to 40° C. and 10 parts of styrene monomer were added. When the temperature of the reaction mixture reached 65° C., 5.0 parts of the catalyst solution were added and the temperature of the reaction mixture was raised to 88° to 89° C. A further 72 parts of styrene monomer and the remaining catalyst solution were added over a period of 2 hours at a reaction temperature of 88° to 90° C. After this addition was complete the reaction mixture was maintained at 90° C. for 30 minutes. The resulting dispersion was then cooled to 30° C. and filtered through a 100 mesh filter. In this way a translucent white dispersion of polystyrene (particle size of polystyrene 0.01 to 0.05 micron) with a total solids content of 36 percent (by weight) was obtained.

EXAMPLE 2b

One hundred seventy-five parts of a shampoo concentrate were made up by mixing 10.5 parts by weight of sodium lauryl sulphate, 2 parts by weight of a 35 percent weight/volume aqueous solution of sodium N-lauroyl sarcosinate, 112.5 parts of water and 50 parts by weight of an aqueous, stabilized, nonfilm-forming polystyrene dispersion containing 35 percent by weight of solids (34 percent of polystyrene) and obtained according to the procedure described in example 2a.

One part of the concentrate so obtained was diluted with 9 parts by volume of water, placed in a foam applicator and applied to an undyed scoured white "nylon 66" tufted carpet to give 1 percent of polystyrene on the fiber on alternate strips leaving an untreated strip between each treated strip to facilitate visual comparison. At this stage, the clean appearance of the treated and untreated strips was noted. The carpet was carefully dried and subjected to tread soiling in a test area. After the wear of each day (calculated 500 to 700 treads) the carpet was vacuum cleaned. At the end of the test the number of treads applied to the carpet under test was approximately 14,000. Visual examination of the carpet indicated a low degree of retained soil on the treated strips of carpet but a heavy residual soil on the untreated portion.

The above experiment was repeated employing a light lemon yellow dyed tufted "Acrilan" (polyacrylonitrile) carpet. The same effect was noted after approximately 14,000 treads. Similar good results were noted on a white printed "Acrilian" carpet.

EXAMPLE 3a 0.7 parts of potassium persulphate were dissolved in 25 parts of water to form the catalyst solution. Five parts of a sulphated alkyl phenoxy polyethoxy ethanol and 5 parts of a condensate of 5 moles of ethylene oxide with n-octyl phenol were dissolved in 180 parts of water in a reaction vessel fitted with a stirrer, reflux condenser and a thermometer. A monomer mixture composed of 79.2 parts of styrene and 0.8 parts of divinyl benzene was prepared. The contents of the reaction vessel were stirred and heated to 40° C., at which point 10 parts of monomer mixture were added and the temperature raised to 65° C. 5.0 parts of the catalyst solution were added and the temperature of the reaction mixture raised to 90° to 92° C. The remainder of the monomer mixture, namely 70 parts was added over 2 hours at a reaction temperature of 90° to 92° C. After this addition the reaction mixture was maintained at 90° C. for 30 minutes. The resulting fine dispersion was then cooled to 30° C. and passed through a 100 mesh filter. The total solids content of the dispersion (particle size of copolymer 0.03 to 0.15 micron) was 29.6 percent (by weight). (Theoretical solids content is 30.5 percent).

EXAMPLE 3b

A shampoo concentrate was prepared in a similar manner to that described in example 2b, but employing the dispersion obtained in example 3a instead of the dispersion used in example 2b.

The concentrate so produced was used to treat a "nylon 66" and an "Acrilan" carpet in the manner described in example 2b. Visual examination of the treated strips of carpet again indicated a low degree of retained soil in comparison to the untreated strips.

EXAMPLE 4

One hundred twenty-five parts of a shampoo concentrate were made up by mixing 12.5 parts of the sodium salt of sulphated lauryl alcohol, 3.0 parts of lauroyl mono-isopropanolamide, 10.0 parts of iso-propanol and 74.5 parts of water with 25 parts of the aqueous stabilized nonfilm-forming copolymer dispersion as prepared in example 3a.

One part of the concentrate so obtained was diluted with 9 parts of water. A carpet made up of pale yellow "nylon 66" was sprayed with the diluted solution in the pattern described in example 1b to give a 2 percent concentration of dispersion by weight on the weight of the carpet and subjected to the wear test.

After 14,000 treads there was a marked striped appearance, the treated strips being markedly less soiled than the untreated. This procedure was repeated for 1.5, 1.0, 0.5 and 0.1 percent parts by weight of the dispersion or the weight of carpet fiber. Even with 0.1 percent some antisoiling properties were noted.

EXAMPLE 5a 0.7 grams of ammonium persulphate was dissolved in 25 parts of water to form the catalyst solution. Twenty-eight parts of polyoxyethylene sorbitan monolaurate were dissolved in 365 parts of water in a reaction vessel fitted with a stirrer, reflux condenser and a thermometer. The temperature was increased to 40° C. and 50 parts of styrene monomer added. At 65° C. 5 parts of the catalyst solution were added and the temperature increased to 88°–90° C. Over 2 hours 230 parts of styrene and the remainder of the catalyst solution were added at a reaction temperature of 90° C. After completing the addition the reaction mixture was maintained at 90° C. for 30 minutes. The resulting fine dispersion was cooled to 30° C. and filtered through a 100 mesh filter. The total solids content of the dispersion (particle size of polystyrene 0.05 to 0.16 micron) was 42.7 percent. (Theoretical solids content is 44.1 percent).

EXAMPLE 5b

A shampoo concentrate was prepared according to the procedure described in example 1b but employing the dispersion produced in example 5a.

The concentrate was then applied to a pale yellow "nylon 66" carpet in the manner described in example 1b. After the wear test of 14,000 treads a good antisoiling effect was noted on the treated strips of carpet.

EXAMPLE 6a

Seven parts of sodium dodecylated oxydibenzene disulphate were dissolved in 182.5 parts of distilled water in a reaction vessel fitted with a stirrer, reflux condenser, dropping funnel and a thermometer. 2.5 parts of a 2 normal acetic acid solution were then added. The temperature was increased to 40° C. and 10 parts of styrene monomer were added. At 65° C. a solution of 0.14 parts of a 10 percent aqueous ferric chloride solution in 10 parts of distilled water was added. The temperature was allowed to rise to 75° C. when 3 parts of a 20 volume hydrogen peroxide solution were added and the temperature was increased to 88° to 90° C. Over a period of 1½ hours, 130 parts of styrene and 5 parts of 20 volume hydrogen peroxide solution were added at a reaction temperature of 90° C. After the completion of addition, the reaction mixture was maintained at 90° C. for 30 minutes. The resulting dispersion was cooled to 30° C. and passed through a 100 mesh filter. The total solids content of the dispersion (particle size of polystyrene 0.01 to 0.8 micron) was 40.4 percent. (Theoretical solids content is 42.0 percent).

EXAMPLE 6b

One hundred and twenty-five parts of a shampoo concentrate were made by mixing 10 parts of the lithium salt of lauryl sulphate, 2 parts of lauroyl mono-isopropanolamide, 0.2 parts of formalin and 87.8 parts of water with 25 parts of the dispersion obtained in the manner described in example 5a.

This concentrate was diluted and then employed to treat a "nylon 66" carpet in alternate treated and untreated strips in the manner described in example 1b. The treated sections contained 0.1, 0.5, 1.0, 1.5 and 2.0 percent by weight of the dispersion on the weight of the carpet respectively.

Again visual examination indicated a good antisoiling effect on each of the treated sections of carpet, with some antisoiling effect noted even for 0.1 percent application.

Similar results were obtained when the "nylon 66" carpet was replaced by an "Acrilan" carpet.

EXAMPLE 7

One hundred seventy-five parts of a shampoo concentrate were made up by mixing 12.5 parts of sodium lauryl sulphate, 2 parts of a 35 percent weight/volume aqueous solution of sodium N-lauroyl sarcosinate, 110.5 parts of water and 50 parts of the dispersion obtained in example 5a.

This concentrate was diluted and then used to treat a yellow "nylon 66" carpet in the manner described in example 1b.

Again a good antisoiling effect was noted on the treated sections of carpet.

EXAMPLES 8 to 12

When the shampoo concentrate described in example 1b was modified by replacing the sodium lauryl sulphate and/or the sodium N-lauroyl sarcosinate employed therein by equivalent proportions of each of the following combinations of detergent compound and foam stabilizer, similar results to those described in example 1b were obtained:

sodium dodecyl benzene sulphonate and sodium N-lauroyl sarcosinate;

potassium lauryl sulphate and sodium N-lauroyl sarcosinate;

sodium dodecyl benzene sulphonate and the condensate of nonyl phenol with six molecules of ethylene oxide;

sodium dodecyl benzene sulphate and coconut monoisopropanolamide; and ammonium lauryl sulphate and ammonium N-lauroyl sarcosinate.

We claim:
1. A composition for application to a pile yarn or fabric to improve the appearance to inhibit deterioration of the appearance thereof, consisting essentially of (a) from 60 to 90 percent of a stabilized aqueous shampoo concentrate which is a mixture of a detergent selected from the group consisting of compounds having the formula $ROSO_3M$ wherein R is an aliphatic hydrocarbon and M is an alkali metal or an ammonium radical, alkali metal alkyl benzene sulfonates, alkali metal salts of secondary alkyl sulphates or alkali metal or ammonium salts of alcohol sulphates, and a foam stabilizing compound having the formula $R^1CO-N(CH_3)-CH_2COOA$ wherein $R^1$ is an aliphatic hydrocarbon group having from 12 to 17 carbon atoms and A is hydrogen, an alkali metal or an ammonium radical and (b) from 10 to 40 percent of a stabilized aqueous nonfilm-forming dispersion of a noncross-linked polystyrene having a molecular weight within the range of from $15 \times 10^4$ to $2 \times 10^6$, substantially all the particles of the dispersed polystyrene having diameters within the range of from 0.03 to 0.15 microns.

2. A composition as described in claim 1, wherein the solids content of said dispersion ranges from about 10 to 60 percent by weight based on the weight of said dispersion, and the total solids content of said shampoo concentrate ranges from about 1 to about 30 percent by weight based on the weight of said concentrate.

3. A composition as claimed in claim 2, wherein the shampoo concentrate is a mixture of
 a. a detergent compound of the formula $R-O-SO_3M$
 b. a foam stabilizing compound of the formula
 $R^1CO-N(CH_3)-CH_2-COO A$
wherein R and $R^1$ represents an aliphatic hydrocarbon group having from 12 to 17 carbon atoms and A represents hydrogen, an alkali metal or an ammonium radical.

4. A composition as claimed in claim 3, wherein the detergent compound is sodium lauryl sulphate.

5. A composition as claimed in claim 3, wherein the foam stabilizing compound is sodium N-lauroyl sarcosinate.

6. A composition as claimed in claim 3, wherein the detergent compound is an alkali metal benzene sulphonate.

7. A composition as claimed in claim 6, wherein the detergent compound is sodium dodecyl benzene sulphonate or potassium dodecyl benzene sulphonate.

8. A composition as claimed in claim 3, wherein the detergent compound is an alkali metal salt of a secondary alkyl sulphate.

9. A composition as claimed in claim 8, wherein the detergent compound is the potassium salt of 2-ethylhexyl sulphate.

10. A composition as claimed in claim 3, wherein the detergent compound is an alkali metal or ammonium salt of an alcohol sulphate.

11. A composition as claimed in claim 10, wherein the detergent compound is the sodium, lithium or ammonium salt of lauryl alcohol sulphate.

12. A composition as claimed in claim 2 wherein the content of shampoo concentrate in said composition is within the range of from 60 to 90 percent by weight based on the total weight of the composition.

13. A composition as claimed in claim 3, wherein the total proportion of the detergent compound, as solid material, in the aqueous shampoo concentrate is within the range of from 1 to 20 percent by weight based on the total weight of the composition.

14. A composition as claimed in claim 3, wherein the total proportion of detergent compound is within the range from 5 to 10 percent by weight based on the total weight of the composition.

15. A composition as claimed in claim 3, wherein the total proportion of the foam stabilizing compound, as solid material, in the aqueous shampoo concentrate is within the range of from 0.1 to 10 percent by weight based on the total weight of the aqueous concentrate.

16. A composition as claimed in claim 3, wherein the total proportion of the foam stabilizing compound is within the range of from 2 to 5 percent by weight based on the total weight of the aqueous concentrate.

17. A composition as claimed in claim 2, wherein the nonfilm-forming dispersion comprises from 0.5 to 10 of an anionic dispersing agent selected from the group consisting of sodium dinaphthylmethane disulfonate, sodium dioctyl sulphosuccinate or sodium N-lauroyl sarcosinate or a nonionic dispersing agent selected from the group consisting of an ethylene oxide condensate with a fatty alcohol or an alkyl phenol, or an N-alkyl betaine.

18. A composition as claimed in claim 17, wherein the dispersing agent is sodium dinaphthyl-methane disulphonate, sodium dioctylsulphosuccinate or sodium N-lauroyl sarcosinate.

19. A composition as claimed in claim 2, wherein the nonfilm-forming dispersion comprises a stabilizing amount of a nonionic dispersing agent.

20. A composition as claimed in claim 19, wherein the nonionic dispersing agent is an ethylene oxide condensate with a fatty alcohol, an ethylene oxide condensate with an alkyl phenol or an N-alkyl betaine.

21. A composition as defined in claim 19, wherein the nonionic dispersing agent is N-hexadecyl betaine.

22. A composition as claimed in claim 17, wherein the amount of stabilizing dispersing agent in said nonfilm-forming dispersion is within the range of from 0.5 to 10 percent by weight based on the total weight of the said dispersion.

23. A composition as claimed in claim 17, wherein the amount of stabilizing dispersing agent in said nonfilm-forming dispersion is within the range of from 0.5 to 3.0 percent by weight based on the total weight of the said dispersion.

24. A method of treating a pile yarn or fabric to improve the appearance or to inhibit the deterioration of the appearance thereof, comprising applying to the surface of said pile yarn or fabric a composition as defined in claim 1.

25. A method as claimed in claim 24, wherein the treated pile yarn or fabric consists essentially of wool, cotton, jute, silk, regenerated cellulose, acetate rayon or a polyamide, polyester, polyolefine, polyvinylidene chloride or polyacrylic fiber or a mixture of vegetable and/or synthetic fiber with wool.

26. A pile yarn or fabric when treated according to the method defined in claim 24.

27. A pile yarn or fabric consisting essentially of wool, cotton, jute, silk, regenerated cellulose, acetate rayon or a polyamide, polyester, polyolefine, polyvinylidene chloride or polyacrylic fiber or a mixture of vegetable and/or synthetic fiber with wool, which pile yarn or fabric has been treated as defined in claim 25.

* * * * *